United States Patent [19]
Ott

[11] Patent Number: 5,464,276
[45] Date of Patent: Nov. 7, 1995

[54] ACCESSORY ASSEMBLY FOR A VEHICLE WHEEL

[76] Inventor: Roderick L. Ott, 790 N. Cedar Bluff Rd., Apt. #2907, Knoxville, Tenn. 37923

[21] Appl. No.: 176,776
[22] Filed: Jan. 3, 1994
[51] Int. Cl.$^6$ ...................................................... B60B 7/06
[52] U.S. Cl. ...................................... 301/37.34; 301/37.38
[58] Field of Search ............................. 301/37.1, 37.26, 301/37.29, 37.31, 37.34, 37.35, 37.36, 37.38

[56] References Cited

U.S. PATENT DOCUMENTS

| 1,481,363 | 1/1924 | Hall . | |
|---|---|---|---|
| 1,494,179 | 5/1924 | Matthew | 301/37.38 X |
| 1,884,238 | 10/1932 | Reutter . | |
| 2,169,237 | 8/1939 | Gasco . | |
| 2,550,222 | 4/1951 | Carlin | 301/37.38 |
| 2,722,460 | 11/1955 | Dieterich | 301/37.34 X |
| 2,754,154 | 7/1956 | Solow . | |
| 2,935,360 | 5/1960 | Lyon | 301/37.38 |
| 3,924,928 | 12/1975 | Trimble . | |
| 5,167,440 | 12/1992 | Fitzgerald | 301/37.35 X |

FOREIGN PATENT DOCUMENTS 462025  2/1937  United Kingdom ................ 301/37.34

Primary Examiner—Russell D. Stormer
Attorney, Agent, or Firm—Michael E. McKee

[57] ABSTRACT

A wheel cover assembly for attachment to a vehicle wheel including a rim and a rim center includes a cover plate and securement mechanisms for securing the cover plate over the wheel rim. The cover plate includes opposite inner and outer faces, and the outer face bears indicia which may personalize the vehicle with which the cover assembly is utilized. In addition, the cover plate is positionable adjacent the rim of a vehicle wheel so that when the plate is positioned adjacent the rim, the inner face of the plate faces the rim. The securement mechanisms include tension members which are connectable to the vehicle wheel rim and which span at least a fraction of the rim when connected thereto. Moreover, the tension members have legs whose lengths are adjustable to accommodate the attachment of the securement means to wheel rims at locations thereon wherein the distance that the attachment locations of one of such wheel rims is spaced from its corresponding rim center is different from the distance that the attachment locations of the other of such wheel rims is spaced from its corresponding wheel center.

14 Claims, 3 Drawing Sheets

ACCESSORY ASSEMBLY FOR A VEHICLE WHEEL

BACKGROUND OF THE INVENTION

This invention relates generally to accessories for vehicles and relates, more particularly, to an accessory which is attachable to a wheel of a vehicle.

It is known that a plate or ornament can be secured to the side of a vehicle wheel for the purpose of decorating or displaying advertisement material from the wheel. Examples of such plates or ornaments are shown and described in U.S. Pat. Nos. 1,481,363, 1,884,238, 2,169,237 and 2,754,154.

It is an object of the present invention to provide a new and improved accessory of the aforedescribed class.

Another object of the present invention is to provide such an accessory which is capable of being used with a wheel and an accompanying hub cap.

Still another object of the present invention is to provide such an accessory which is capable of being attached to wheel rims at locations thereon which are spaced at different locations from the center of the rims.

Still another object of the present invention is to provide such an accessory which is uncomplicated in construction and effective in operation.

SUMMARY OF THE INVENTION

This invention resides in a wheel cover assembly for attachment to a vehicle wheel including a rim and wherein the rim includes a center.

The wheel cover assembly includes a cover plate including two opposite inner and outer faces, and the outer face of the plate bears indicia. The cover plate is positionable adjacent the rim of a vehicle wheel so that the inner face of the plate generally faces the rim. The assembly also includes securement means for attaching the cover plate to the rim of the vehicle wheel wherein the securement means includes tension means which are connectable to the vehicle wheel and which span at least a fraction of the rim when connected thereto. In addition, the tension means has a length which is adjustable to accommodate the attachment of the securement means to wheel rims at locations thereon wherein the distance that the attachment locations of one of such wheel rims is spaced from its corresponding rim center is different from the distance that the attachment locations of the other of such wheel rims is spaced from its corresponding wheel center.

DETAILED DESCRIPTION OF THE ILLUSTRATIVE EMBODIMENTS

Figure 1:
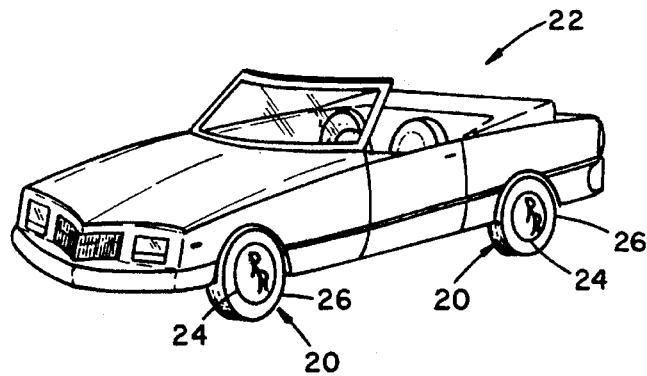
FIG. 1 is a perspective view of a vehicle upon which an embodiment of a wheel cover accessory assembly is mounted.

Turning now to the drawings in greater detail, there is shown a typical environment in which a wheel cover accessory assembly, generally indicated 20, is utilized. More specifically, the environment includes a vehicle 22 having four wheels 24 (only two shown in FIG. 1) wherein each wheel 24 includes a tire 26 and rim-including means 28 (hereinafter rim means 28) about which the tire 26 is mounted. As will be apparent herein, the accessory assembly 20 is attached to the rim means 28 of the wheel 24 for the exemplary purpose of decorating the wheel 24.

Figure 2:
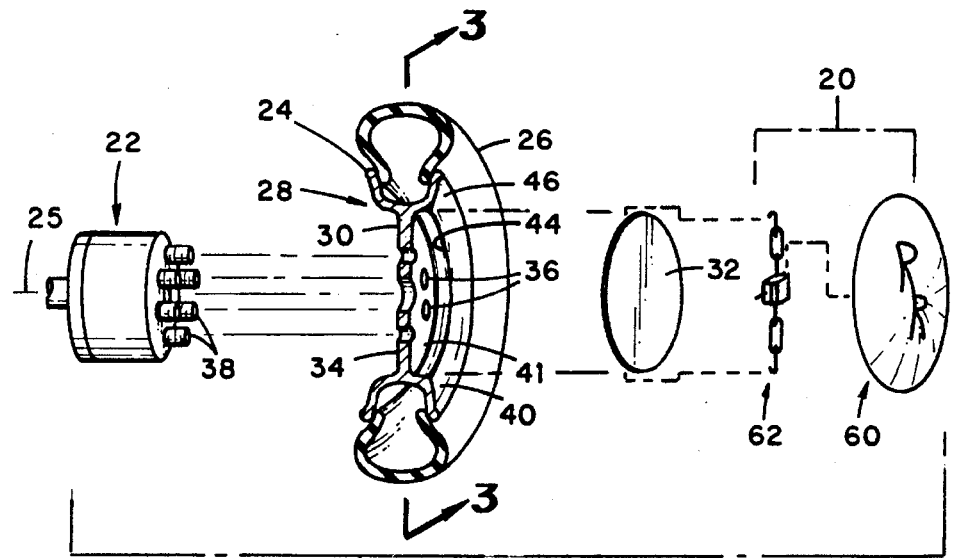
FIG. 2 is a perspective view, shown exploded and partly in section, of a wheel of the FIG. 1 vehicle and the accessory assembly mounted thereon.

With reference to FIG. 2, the rim means 28 of the depicted wheel 24 includes a load-bearing portion 30 about which the tire 26 is positioned for rotation about a central axis 25 and a hub cap 32 releasably secured to the load-bearing portion 30. The load-bearing portion 30 includes an inner, or disc, section 34 having apertures 36 spaced about the central axis 25 for accepting wheel lug bolts 38 used for securement of the wheel 24 to the remainder of the vehicle 22 and including an outwardly-facing side face 40 to which the hub cap 32 is connectable. To this end, the side face 40 of the depicted wheel 24 includes a central recessed area 41 having a periphery bordered by a radially inwardly-directed lip 44 (best shown in FIG. 3) which cooperates with the hub cap 32 to secure the cap 32 to the load-bearing portion 30 in a snap fit relationship. The load-bearing portion 30 further includes an outer peripheral, or rim section 46 about which the tire 26 of the wheel 24 is mounted. It follows from the foregoing that by securing the load-bearing portion 30 of the rim means 28 upon the wheel lug bolts 38, the tire 26 is secured to the remainder of the vehicle 22.

Figure 3:
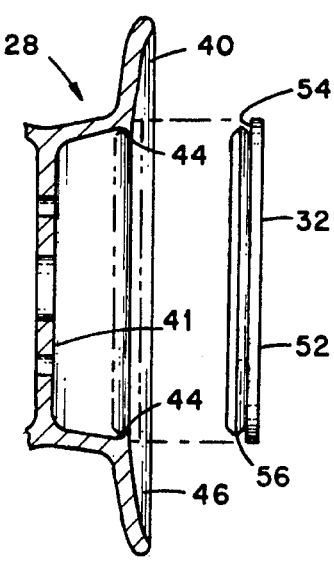
FIG. 3 is a fragmentary cross-sectional view of a wheel of the FIG. 1 vehicle taken about along line 3—3 of FIG. 2.

With reference to FIGS. 2 and 3, the depicted hub cap 32 of the rim means 28 is generally platen-like in form and is generally circular in shape. The outer face, indicated 52, of the hub cap 32 is generally flat, and the inner face, indicated 54, of the cap portion 32 is flat over a major portion of its area and is bounded by a ring 56 attached thereto and generally projecting from the side of the cap portion 32 opposite the outer face 52, as shown in FIG. 3. The ring 46 is sized to be slightly greater than the opening bounded by the lip 44 of the rim means 28 and possesses a degree of flexibility so that upon positioning the cap portion 32 in registry with the opening encircled by the lip 44 and forcibly urging the cap portion 32 into the recessed area 41, the ring 56 flexes inwardly and secures the cap portion 32 to the load-bearing portion 30 of the rim means 28 in a snap-fit relationship therewith. By inserting the tip of a tipped tool, such as a screw driver (not shown) between the lip 44 bordering the recessed area 41 and the edge of the hub cap 32, the hub cap 32 can be pried from the rim means 28.

The aforedescribed rim means 28 with its interfitting load-bearing portion 30 and hub cap 32 represent only a single example of wheel rim means whose hub cap interlocks with the load-bearing portion in a snap-fit arrangement. It will be understood that the rim means with which the accessory assembly 20 can be used need not be characterized as having a snap-on hub cap. Accordingly, the principles of the invention may be variously applied, and the terms "rim" and "rim means" as used in the interests of the present invention are intended to include wheel rims which include hub caps and wheel rims without hub caps.

Figure 4:
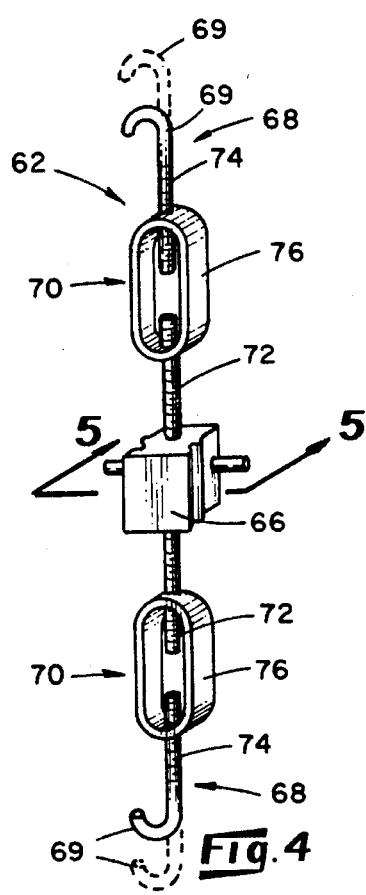
FIG. 4 is a perspective view of one component of the FIG. 1 assembly.

With reference to FIGS. 2 and 4, the accessory assembly 20 includes a cover plate 60 and securement means, generally indicated 62, for securing the plate 60 to the rim means 28. As will be apparent herein, the securement means 62 of the depicted assembly 22 is securable about the hub cap 32 and the cover plate 60 is, in turn, securable to the securement means 62.

The securement means 62 of the assembly 22, as best shown in FIG. 4, includes a central body 66 and a plurality of elongated tension means 68 which extend generally radially outwardly of the body 66 and terminate in a hook 69. When operatively secured to the rim means 28 depicted in FIG. 2, the hooks 69 are hooked about the edges of the hub cap 32 and the remainder of the tension means 68 span the outer face of the hub cap 32. As will be apparent herein, the cover plate 60 of the assembly 20 is securable to the body 66 to thereby secure the plate 60 to the rim means 28.

Each tension means 68 of the securement means 62 includes a turnbuckle assembly 70 which permits an adjustment in the distance that the hook 69 is spaced from the body 66. In this connection, each tension means 68 includes a threaded inner shank 72 having an end which is fixedly secured within the body 66 and an outer (hook-providing) shank 74 having a threaded main section which is aligned with the inner shank 72. An elongated intermediate member 76 has opposite ends which are threadably secured about the shanks 72, 74 so that by rotating the member 76 in one rotational direction about the longitudinal axes of the shanks 72, 74, the distance between the body 66 and the hook 69 is lengthened, and so that by rotating the member 76 in the opposite rotational direction about the axes of the shanks 72, 74, the distance between the body 66 and the hook 69 is shortened. As the distance between the body 66 and the hook 69 is lengthened, the hook 69 is moved away from the body 66 from, for example, its position illustrated in solid lines in FIG. 4 to its position illustrated in phantom in FIG. 4. Conversely, as the distance between the body 66 and the hook 69 is shortened, the hook 69 is moved toward the body 66 from, for example, its FIG. 4 phantom-line position to its FIG. 4 solid-line position. It follows that the threads of one of the shanks 72 or 74 (as well as the threads of the corresponding shank-accepting threaded end of the intermediate member 76) is right-handed, while the threads of the other of the shanks 74 or 72 is left-handed.

The depicted assembly 20 includes two tension means 68 which are disposed on opposite sides of the body 66, and each hook 68 is relatively thin so that when hooked about a corresponding edge of the hub cap 32, the hook 69 does not interfere with the placement of the hub cap 32 upon the load-bearing portion 30 or the removal of the hub cap 32 from the load-bearing portion 30. The components of each tension means 68 can be constructed of any of a number of materials, such as steel.

Figure 5:
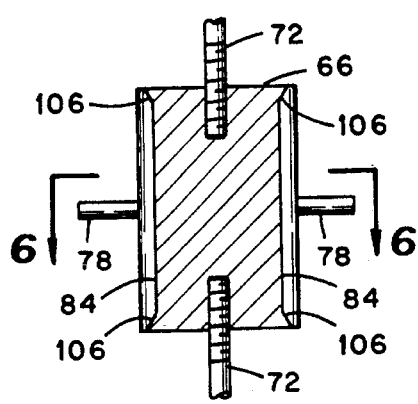
FIG. 5 is a cross-sectional view taken about along line 5—5 of FIG. 4.
Figure 6:
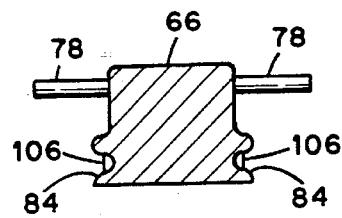
FIG. 6 is a cross-sectional view taken about along line 6—6 of FIG. 5.

The body 66 of the securement means 62 can be constructed, for example, out of plastic or metal and includes ends within which the ends of the inner shanks 72 are fixedly embedded. To aid in the stability of the body 66 when attached, by way of the tension means 68, upon the hub cap 32, two laterally-extending prongs 78 are attached to so as to protrude from the opposite sides of the body 66. In use, the body 66 is adapted to cooperatively interfit with the cover plate 60 of the assembly 20 so that the cover plate 60 can be releasably secured thereto. To this end, the opposite sides of the body 66 define grooves 84 (best shown in FIGS. 5 and 6) which extend for a substantial distance along the length of the body 66. For purposes of attaching the cover plate 60 to the body 66, these grooves 84 act as parallel guide tracks adapted to slidably accept a corresponding component, i.e. a guide track follower, associated with the cover plate 60.

Figure 7:
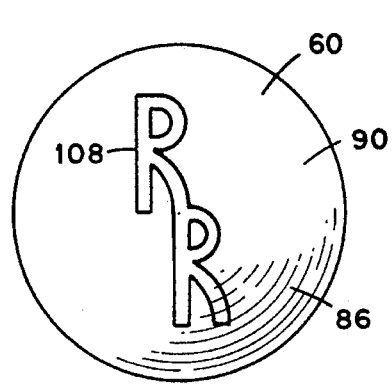
FIG. 7 is an elevational view of another component of the FIG. 1 assembly as seen from the front.
Figure 8:
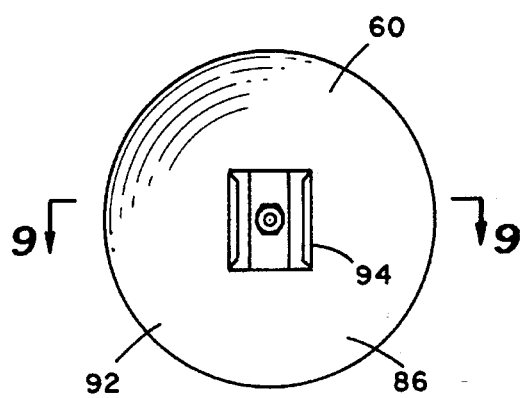
FIG. 8 is an elevational view of the FIG. 7 component as seen generally from the back.

With reference to FIGS. 7 and 8, the cover plate 60 of the assembly 20 includes a disc 86 sized to cover the hub cap 32 of the rim means 28. To this end, the diameter of the disc 86 is at least as great as the diameter of the hub cap 32 of the rim means 28 so that when positioned thereover, the hub cap 32 is completely hidden from view by the disc 86. The disc 86 is shaped so as to define a convex outer surface 90 and a concave inner surface 92 and is relatively thin as measured between the outer and inner surfaces 90 and 92. In addition, the disc 86 can be constructed out of any of a number of suitable materials, such as steel.

Figure 9:
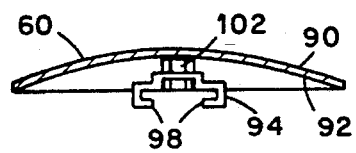
FIG. 9 is a cross-sectional view taken about along line 9—9 of FIG. 8.
Figure 10:
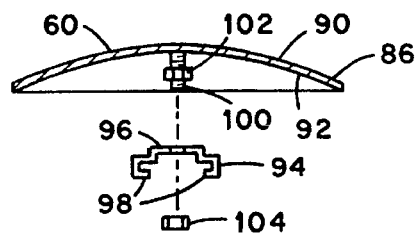
FIG. 10 is a view of the FIG. 9 assembly, shown exploded.

For purposes of securing the cover plate 60 to the securement means 62 and with reference to FIGS. 9 and 10, the plate 60 includes a bracket 94 fixedly attached along the inner surface 92 of the disc 86 and adapted to releasably interfit with the body 66 of the securement means 62. The bracket 94 is generally U-shaped in cross section having a central section 96 and two opposite side sections 98, 98 which are shaped to slidably move along the grooves 84 of the body 66 (as the bracket 94 acts as a guide track follower) when moved into its secured relationship with the body 66. For attachment of the bracket 94 to the disc 86, a threaded lug 100 is welded, or otherwise attached, to so as to project from the center of the inside surface 92 of the disc 86, and the bracket central section 96 includes an opening sized to accept the lug 100 when inserted thereover. A first nut 102 is threaded upon the lug 100 and acts as a spacer between the bracket 94 and the inside surface 92 of the disc 86 and a second nut 104 is tightened upon the lug 100 so that the central section 96 of the bracket 94 is tightly held between the first and second nuts 102 and 104.

As mentioned earlier, the bracket 94 acts as a guide track follower when moved into its operative relationship with the body 66. To this end, each side section 98 is shaped to be slidably received by a corresponding groove 84 provided along a side of the body 66 when inserted endwise therein. Thus, the distance as measured between the side sections 98, 98 of the bracket 94 correspond with the thickness of the body 66 as measured between its sides 82. To releasably secure the bracket 94 in place along the body 66, the bracket 94 and, in particular, its side sections 98 are constructed of a resilient material and possess a degree of flexibility, and the body 66 includes a raised portion 106 (FIGS. 5 and 6) adjacent the end of each of its grooves 84. Therefore, when the bracket 94 is directed edgewise over the body 66 with its side sections 98 in registry with the grooves 84, the side sections 98 flex slightly to accomodate the passage of the side sections 98 over the raised portions 106 and subsequently return to an unflexed condition when moved to its position between the raised portions 106. The bracket 94 thereby interfits with the body grooves 84 in a snap-fit relationship.

With reference again to FIG. 7, it is a feature of the cover plate 60 that its outer surface 90 bear indicia 108. The indicia 108 may take any of a number of forms, such as letters, words, logos or other graphic designs which have been printed upon or otherwise attached to the outer surface 90. As an alternative to the printing of the indicia 108 upon the outer surface 90, the indicia 108 can be embossed in the material of the disc 86 so that the resulting indicia 108 protrude from, or are recessed within, the outer surface 90. An exemplary purpose to be served by the indicia 108 is that which relates to the decoration of the vehicle 22. The owner of the vehicle could select the indicia 108 borne by the disc surface 90 so his vehicle is set apart from others. In such a case, the purpose served by the indicia 90 would be to personalize his vehicle in a manner comparable to the purpose served by vanity license plates commonly displayed on vehicles. It follows that the material of the disc 90 may be any of a number of suitable materials, such as metal or hard plastic, capable of bearing indicia on its outer surface 90.

To install the wheel cover assembly 20 in place upon the wheel 24 of the vehicle 22, the hub cap 32 is removed from the remainder of the rim means 28, and the securement means 62 is attached across the hub cap 32 by hooking the hooks 69 of the tension means 68 about the edges of the hub cap 32 (at diametrically opposed locations therealong) and then rotating the turnbuckle intermediate members 76 in appropriate directions so that the tension means 68 span the outer surface of the hub cap 32 in a relatively taut condition. Preferably, each of the turnbuckle members 68 are rotated by an appropriate amount so that upon placing the tension means 68 in a relatively taut condition across the hub cap 32, the body 66 is substantially centered within the outer face of the hub cap 32. The hub cap 32 is then replaced upon the remainder of the wheel 24 by positioning the hub cap 32 in a snap-fit relationship with the load-bearing portion 30 of the wheel rim means 28. In some applications, the load-bearing portion of the rim means is provided with notches adjacent the edges of a hub cap for accepting the tip of a screwdriver inserted behind the hub cap, and it is through these notches that the hooks of the tension means can pass when the hub cap 32 is re-attached to the remainder of the rim means 28.

Figure 11:
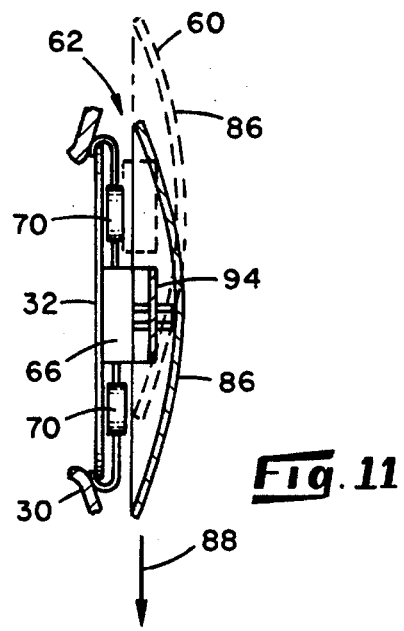
FIG. 11 is a cross-sectional view of another fragment of the wheel and accessory assembly of FIG. 1 taken about along line 3—3 of FIG. 2.

With the securement means 62 positioned in a taut condition across the hub cap 32, the cover portion 60 is attached to the securement means 62 by positioning its disc 86 (as depicted in phantom in FIG. 11) in such a relationship with the body 66 so that the sides sections 98 of the bracket 94 are oriented in registry with the grooves 84 provided along the sides of the body 66. The disc 86 is then maneuvered appropriately, e.g. in the direction of the arrow 88 of FIG. 11, so that the side sections 98 of the bracket 94 are slidably moved along the body grooves 84 to the position therealong (as depicted in solid lines in FIG. 11) at which the bracket 94 is releasably secured in its snap-fit relationship upon the body 66. Since the body 66 is substantially centered upon the hub cap 32, and the bracket 94 is substantially centered upon the inside surface of the disc 86, the cover portion 62 is substantially centered over the wheel rim means 28 when operatively attached thereto.

The assembly 20 is advantageous in that its turnbuckle assemblies 70 enable the securement means 62 to be securely attached across a hub cap 32 having a diameter within a relatively broad range of diameters. Thus, the hub cap (or rim means) with which the assembly 20 is used need not possess a specific diameter in order for the securement means 62 to be attached thereto.

Figure 12:
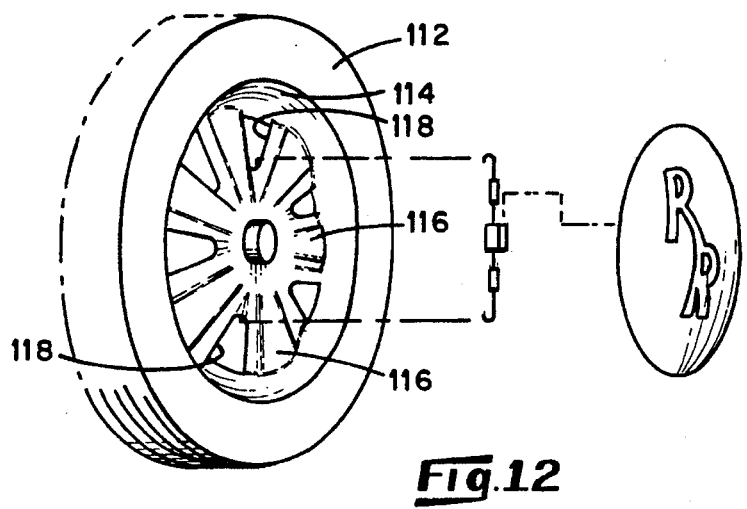
FIG. 12 is a perspective view of another vehicle wheel with which the accessory assembly of FIG. 1 can be utilized.

Moreover, and as mentioned earlier, the rim means with which the accessory assembly 20 can be used need not include a hub cap. For example, there is shown in FIG. 12 a vehicle wheel 112 having a rim 114 including a plurality of spoke sections 116 extending radially outwardly of the rotational center of the wheel 112 and includes an opening 118 provided between each pair of adjacent spoke sections 116. To attach the securement means 62 to the rim 114, each hook 69 is hooked about the edge of an opening 118 wherein the openings within which the hooks 69 are secured are located at diametrically opposed locations on the rim 114. The turnbuckle assemblies 70 are then rotated in the appropriate rotational directions to place the body 66 in a taut condition across the center of the rim 114, and the cover plate 62 is secured upon the body 66 as described above in connection with the rim means 28 of FIG. 11.

Figure 13:
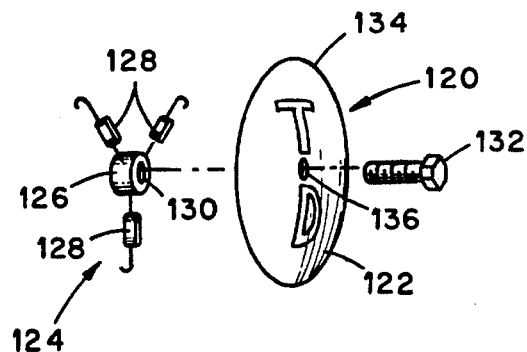
FIG. 13 is a perspective view of another embodiment of the accessory assembly, shown exploded.

It will be understood that numerous modifications and substitutions can be had to the aforedescribed embodiment without departing from the spirit of the invention. For example, although the securement means 62 of the assembly 20 of FIGS. 1–11 has been shown and described as including two tension means 68, securement means in accordance with the broader aspects of the present invention may possess any of a number of such tension means, such as three (as shown in the embodiment of FIG. 13) or four, which extend from a common body. Preferably, however, the tension means are regularly spaced about a central body to facilitate the tensioning of the securement means to a taut condition across a wheel rim.

Still further, although the aforedescribed assembly 20 of FIGS. 1–11 has been shown and described as including a cover plate 60 which interfits with securement means 62 in a snap-fit relationship, an assembly in accordance with the broader aspects of the present invention may possess a cover plate and securement means which can be affixed to one another by alternative means. For example, there is shown in FIG. 13 an embodiment of an accessory assembly, generally indicated 120, having a cover plate 122 and securement means 124 for securing the cover plate 122 to the rim of a vehicle wheel. The securement means 124 includes a central body 126 from which tension means 128 extend, and the body 126 includes a threaded opening 130 for receiving the shank of a bolt 132 threaded therein. The cover plate 122 includes a disc 134 having a central opening 136 for receiving the shank of the bolt 132 inserted endwise therethrough. To secure the cover plate 122 to the securement means 124, the disc 134 is positioned adjacent the central body 126 so that its opening 136 is aligned with the opening 136 of the body 126, and the bolt 132 is threaded within the body opening 136 so that the disc 134 is tightly held between the surface of the body 126 and the head of the bolt 132.

Accordingly, the aforedescribed embodiment is intended for the purpose of illustration and not as limitation.

I claim:

1. A wheel cover assembly for attachment to a vehicle wheel having means including a rim about which a tire is mounted and wherein the rim-including means includes a center which corresponds with the axis of wheel rotation, the assembly comprising:

a cover plate including two opposite inner and outer faces, the outer face bearing indicia, and the cover plate being positionable adjacent the rim-including means of a vehicle wheel so that the inner face of the plate generally faces the rim-including means; and securement means for attaching the cover plate to the rim-including means of the vehicle wheel and including tension means which are connectable to the vehicle wheel and which span at least a fraction of the rim-including means when connected thereto; and the tension means having a length which is adjustable to accommodate the attachment of the securement means to the rim-including means of wheels at locations thereon wherein the distance that the attachment locations of one of such wheel rim-including means is spaced from its corresponding center is different from the distance that the attachment locations of the other of such wheel rim-including means is spaced from its corresponding center; and the rim-including means of the vehicle wheel includes a hub cap, and the securement means is connectable to the hub cap for attaching the cover plate to the wheel rim-including means.

2. The assembly as defined in claim 1 wherein the tension means includes a hook adapted to be hooked to the rim-including means at a location thereat for joining the securement means to the rim-including means.

3. The assembly as defined in claim 1 wherein the tension means includes a turnbuckle assembly for tensioning the tension means to a taut condition across the wheel rim-including means.

4. The assembly as defined in claim 1 wherein the securement means includes a central body to which the cover plate is securable, and the tension means includes tension members which are joined to so as to extend generally radially from the central body.

5. The assembly as defined in claim 4 wherein the tension members of the tension means are regularly spaced about the central body.

6. The assembly as defined in claim 4 wherein the central body and the cover plate are securable to one another in a snap-fit relationship.

7. The assembly as defined in claim 4 wherein each of the tension members of the tension means includes a turnbuckle assembly for tensioning the tension means to a taut condition across the wheel rim.

8. A wheel cover assembly for attachment to the wheel of a vehicle wherein the wheel includes means including a rim about which a tire is mounted and the rim-including means includes a center which corresponds with the axis of wheel rotation, the assembly comprising:

a cover plate having an outer surface, indicia borne by the outer surface, and an inner surface positionable so as to face the rim-including means of the wheel; and securement means cooperable with each of the plate and rim-including means for securing the plate to the rim-including means, the securement means having tension means which are connectable to the vehicle wheel and which span at least a fraction of the rim-including means when connected thereto; and the tension means having a length which is adjustable to accommodate the selected attachment of the securement means to locations about one wheel rim-including means or to locations about another wheel rim, including means wherein the distance as measured from said locations on said one wheel rim-including means to the corresponding center is different from the distance as measured from said locations on said another wheel rim-including means to the corresponding center; and the rim-including means of the vehicle wheel includes a hub cap, and the securement means is connectable to the hub cap for attaching the cover plate to the wheel rim-including means.

9. The assembly as defined in claim 8 wherein the tension means includes a hook adapted to be hooked to the rim-including means at a location thereat for joining the securement means to the rim-including means.

10. The assembly as defined in claim 8 wherein the tension means includes a turnbuckle assembly for tensioning the tension means to a taut condition across the wheel rim-including means.

11. The assembly as defined in claim 8 wherein the tension means includes tension members, the securement means includes a central body to which the cover plate is securable, and the tension members are joined so as to extend generally radially from the central body.

12. The assembly as defined in claim 11 wherein the tension members are regularly spaced about the central body.

13. The assembly as defined in claim 11 wherein the central body and the cover plate are securable to one another in a snap-fit relationship, 14. The assembly as defined in claim 13 wherein each of the tension members includes a turnbuckle assembly for tensioning the tension members to a taut condition across the wheel rim.

* * * * *